(12) United States Patent
Hoshi et al.

(10) Patent No.: US 12,375,819 B2
(45) Date of Patent: Jul. 29, 2025

(54) GATING CAMERA, SENSING SYSTEM FOR VEHICLE, VEHICLE LAMP

(71) Applicant: KOITO MANUFACTURING CO., LTD., Tokyo (JP)

(72) Inventors: Kenichi Hoshi, Shizuoka (JP); Yasuo Nakamura, Shizuoka (JP); Koji Itaba, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 11 days.

(21) Appl. No.: 18/294,880

(22) PCT Filed: Aug. 5, 2022

(86) PCT No.: PCT/JP2022/030166
§ 371 (c)(1),
(2) Date: Feb. 2, 2024

(87) PCT Pub. No.: WO2023/013777
PCT Pub. Date: Feb. 9, 2023

(65) Prior Publication Data
US 2024/0430578 A1 Dec. 26, 2024

(30) Foreign Application Priority Data
Aug. 5, 2021 (JP) ................................. 2021-129014

(51) Int. Cl.
*H04N 23/74* (2023.01)
*H04N 23/72* (2023.01)
(Continued)

(52) U.S. Cl.
CPC ............. *H04N 23/74* (2023.01); *H04N 23/72* (2023.01); *H04N 23/73* (2023.01); *H04N 25/78* (2023.01); *H04N 23/741* (2023.01)

(58) Field of Classification Search
CPC ........ H04N 23/74; H04N 23/73; H04N 23/72; H04N 23/741; H04N 25/78
(Continued)

(56) References Cited

U.S. PATENT DOCUMENTS

| 10,445,896 B1 | 10/2019 | Bills et al. |
| 2015/0160340 A1 | 6/2015 | Grauer et al. |

(Continued)

FOREIGN PATENT DOCUMENTS

| JP | 2009-257981 A | 11/2009 |
| WO | 2017/110417 A1 | 6/2017 |

OTHER PUBLICATIONS

Communication dated Nov. 22, 2024, issued by European Patent Office in European Patent Application No. 22853195.0.
(Continued)

*Primary Examiner* — Allen C Wong
(74) *Attorney, Agent, or Firm* — Sughrue Mion, PLLC

(57) ABSTRACT

An illumination device irradiates a field of view with pulsed illumination light. In a multi-tap type image sensor, one pixel has a plurality of FD (floating diffusion) regions. A camera controller controls a light emission timing of the illumination device and an exposure timing of the image sensor. A pulse exposure region, which is one of the plurality of FD regions, is allocated to generation of a slice image, and a continuous exposure region, which is another one of the plurality of FD regions, is allocated to generation of a normal image. The image sensor generates the slice image by performing multiple exposure of reflected light of the pulsed illumination light from the field of view using the pulse exposure region, and generates the normal image by performing exposure using the continuous exposure region in a section where the pulse exposure region is not used.

11 Claims, 13 Drawing Sheets

(51) Int. Cl.
*H04N 23/73* (2023.01)
*H04N 25/78* (2023.01)
*H04N 23/741* (2023.01)

(58) Field of Classification Search
USPC ........................................... 348/148
See application file for complete search history.

(56) References Cited

U.S. PATENT DOCUMENTS

2019/0004150 A1* 1/2019 Mano .................... G01S 7/4868
2020/0013811 A1* 1/2020 Jin .......................... H04N 25/78

OTHER PUBLICATIONS

International Search Report (PPCT/ISA/210) issued Sep. 13, 2022 by the International Searching Authority in International Patent Application No. PCT/JP2022/030166.

* cited by examiner

GATING CAMERA, SENSING SYSTEM FOR VEHICLE, VEHICLE LAMP

CROSS-REFERENCE TO RELATED APPLICATIONS

This application is a National Phase Entry of PCT International Application No. PCT/JP2022/030166 filed on Aug. 5, 2022, which claims priority to Japanese Patent Application No. 2021-129014 filed on Aug. 5, 2021.

TECHNICAL FIELD

The present invention relates to a gating camera.

BACKGROUND ART

An object identification system that senses a location and a type of an object around a vehicle is used for automatic driving or automatic control of a light distribution of a headlamp. The object identification system includes a sensor and an arithmetic processing device that analyzes an output of the sensor. The sensor is selected from a camera, a light detection and ranging or laser imaging detection and ranging (LiDAR), a millimeter-wave radar, an ultrasonic sonar, and the like, considering use, required precision, and cost.

Depth information cannot be obtained from a general monocular camera. Therefore, when a plurality of objects located at different distances overlap, it is difficult to separate the objects.

As a camera from which depth information is obtained, a TOF camera is known. A time of flight (TOF) camera projects infrared light by a light-emitting device, measures a time of flight until reflected light returns to an image sensor, and obtains a TOF image by converting the time of flight into distance information.

A gating camera or gated camera has been suggested as an active sensor replacing the TOF camera (Patent Literatures 1 and 2). The gating camera divides a shooting range into a plurality of ranges and captures images while changing an exposure timing and an exposure time for each range. Thereby, a slice image is obtained for each target range, and each slice image includes only an object included in the corresponding range.

CITATION LIST

Patent Literature

Patent Literature 1: JP2009-257981A
Patent Literature 2: WO2017/110417A1

SUMMARY OF INVENTION

Technical Problem

In order to obtain an image (referred to as a normal image) not divided into ranges similar to those of a normal camera by a gating camera, it is necessary to capture slice images of a plurality of ranges and then to synthesize the captured images.

In order to increase the resolution in a depth direction in the gating camera, in other words, to shorten a length (depth) in the depth direction of a range, it is necessary to shorten a pulse width and an exposure time of illumination light. In this case, in order to obtain a sufficiently bright slice image, it is necessary to increase the number of times of sets of irradiation/exposure, which increases a time required to generate one slice image. Furthermore, if the depth of one range is shortened, the number of ranges increases, so a shooting time for a full range becomes even longer.

One aspect of the present disclosure has been made in view of the above situations, and one of exemplary objects thereof is to provide a gating camera that can shorten a generation time of a normal image.

Solution to Problem

One aspect of the present disclosure relates to a gating camera configured to divide a field of view in a depth direction into a plurality of ranges and to generate a plurality of slice images corresponding to the plurality of ranges. The gating camera includes an illumination device configured to irradiate the field of view with pulsed illumination light, a multi-tap type image sensor in which one pixel has a plurality of FD (floating diffusion) regions, and a camera controller configured to control a light emission timing of the illumination device and an exposure timing of the image sensor. One of the plurality of FD regions is allocated as a pulse exposure region for generating a slice image, and another one of the plurality of FD regions is allocated as a continuous exposure region for generating a normal image. The image sensor is configured to generate the slice image by performing multiple exposure of reflected light of the pulsed illumination light from the field of view using the pulse exposure region, and to generate the normal image by performing exposure using the continuous exposure region in a section where the pulse exposure region is not used.

Advantageous Effects of Invention

According to one aspect of the present disclosure, a generation time of a normal image can be shortened.

DESCRIPTION OF EMBODIMENTS

Outline of Embodiments

Figure 1:
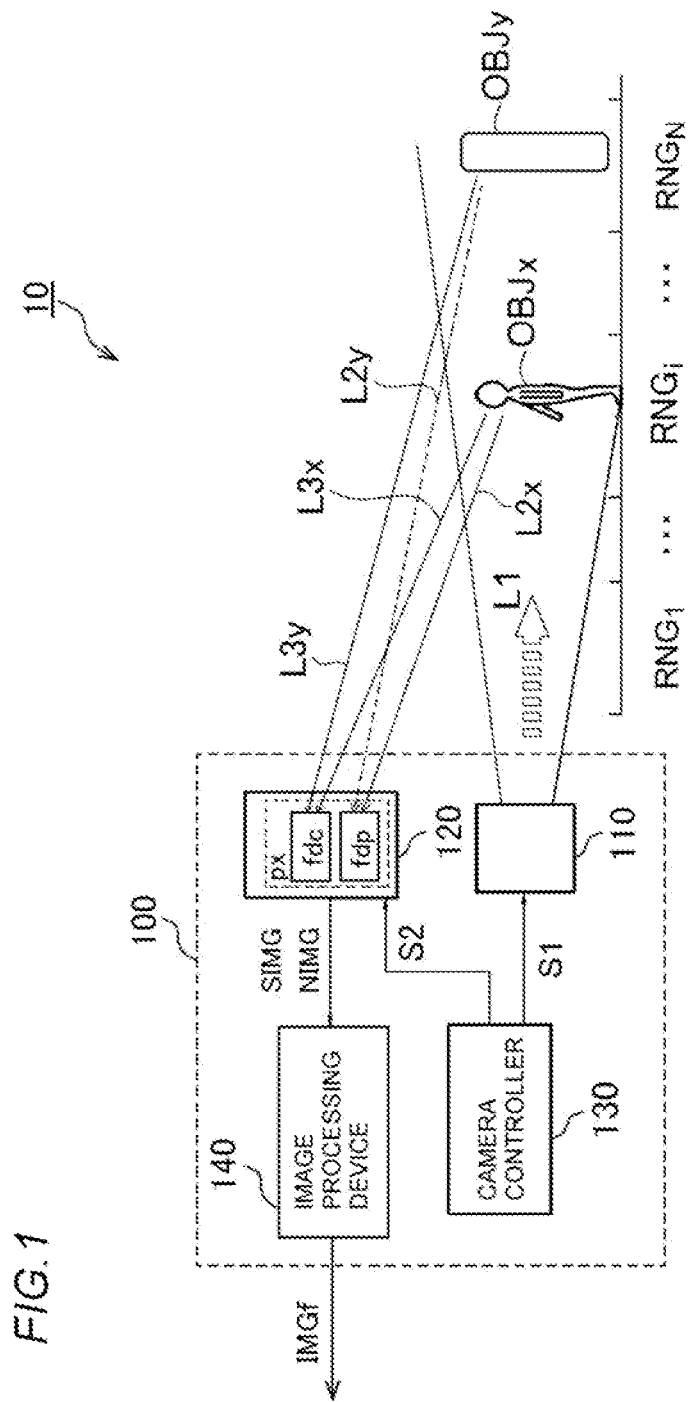
FIG. 1 is a block diagram of a sensing system according to a first embodiment.

An outline of several exemplary embodiments of the present disclosure will be described. The outline is a simplified explanation regarding several concepts of one or multiple embodiments as an introduction to the detailed description described below in order to provide a basic understanding of the embodiments, and is by no means intended to limit the scope of the present invention or disclosure. Furthermore, the outline is by no means a comprehensive outline of all conceivable embodiments, and does not limit the essential components of the embodiments. For convenience, in some cases, "one embodiment" as used herein refers to a single embodiment (embodiment or variation) or a plurality of embodiments (embodiments or variations) disclosed in the present specification.

The gating camera according to one embodiment is configured to divide a field of view in a depth direction into a plurality of ranges and to generate a plurality of slice images corresponding to the plurality of ranges. The gating camera includes an illumination device configured to irradiate the field of view with pulsed illumination light, a multi-tap type image sensor in which one pixel has a plurality of FD (floating diffusion) regions, and a camera controller configured to control a light emission timing of the illumination device and an exposure timing of the image sensor. It is allocated as a pulse exposure region for generating a slice image, and another one of the plurality of FD regions is allocated as a continuous exposure region for generating a normal image. The image sensor is configured to generate the slice image by performing multiple exposure of reflected light of the pulsed illumination light from the field of view using the pulse exposure region, and to generate the normal image by performing exposure using the continuous exposure region in a section where the pulse exposure region is not used.

For generation of a slice image, it is necessary to repeatedly perform irradiation of pulsed illumination light and short-time exposure in synchronization with the irradiation. In a period during which a slice image is not subjected to exposure, charges are accumulated in the continuous exposure region and continuous exposure is performed, thereby making it possible to capture a normal image not divided into a plurality of ranges in a short time.

In one embodiment, the image sensor may be configured to read at an independent timing for each FD region. This allows a normal image capturing time to be further shortened.

In one embodiment, the illumination device may be configured to irradiate the field of view with continuous illumination light, in addition to the pulsed illumination light. The continuous illumination light is subjected to exposure by the continuous exposure region, so that normal images over the plurality of ranges can be captured in a shorter time.

In one embodiment, the illumination device may be configured to irradiate the field of view with the continuous illumination light during capturing at night. During the day when there is sunlight, the continuous illumination light is turned off, whereby power consumption can be reduced.

In one embodiment, the continuous exposure region may be plural. The image sensor may be configured to generate the normal image by performing exposure using the plurality of continuous exposure regions in a time division manner, during a continuous exposure period in which the pulse exposure region is not used. Each exposure time of the plurality of continuous exposure regions may different. As a result, when a difference in brightness and darkness in the field of view is large, an image with a wide dynamic range can be captured using images captured by the plurality of continuous exposure regions.

In one embodiment, the image sensor may be configured to generate the slice image by pixel binning and to generate the normal image by dot-by-dot. This can increase a generation rate of the slice image in exchange for deterioration in resolution. For the normal image, a high-resolution image can be obtained by dot-by-dot reading.

In one embodiment, the image sensor may be configured to perform binning of pixels of 2 rows and 2 columns as a virtual pixel. Each pixel may include m (m≥1) pulse exposure regions and n (n≥1) continuous exposure regions. The image sensor may include m first reading circuits and n second reading circuits. The m first reading circuits may be associated with the m pulse exposure regions, and the n second reading circuits may be associated with the n continuous exposure regions. An i-th (1≤i≤m) first reading circuit may be configured to add a signal of an i-th pulse exposure region of each of the four pixels included in the virtual pixel and read the added signal, and a j-th (1≤j≤n) second reading circuit may be configured to read a signal of a j-th continuous exposure region included in the corresponding pixel. According to this configuration, the slice image can be generated by pixel binning, and the normal image can be generated by dot-by-dot.

Embodiments

Hereinafter, favorable embodiments will be described with reference to the drawings. The same or equivalent components, members and processing shown in each drawing are denoted with the same reference numerals, and repeated descriptions will be omitted appropriately. Furthermore, the embodiments are illustrative, not limiting the invention, and all features or combinations thereof described in the embodiments are not necessarily essential to the invention.

FIG. 1 is a block diagram of a sensing system 10 according to a first embodiment. The sensing system 10 is mounted on a vehicle such as an automobile or a motorcycle, and detects an object OBJ around the vehicle (in a field of view of a sensor).

The sensing system 10 mainly includes a gating camera 100. The gating camera 100 include an illumination device 110, an image sensor 120, a camera controller 130, and an arithmetic processing device 140. The gating camera 100 divides a field of view in a depth direction into N ranges $RNG_1$ to $RNG_N$ (N≥2), and performs imaging. Adjacent ranges may overlap in the depth direction at their boundaries.

The illumination device 110 irradiates the front of the vehicle with pulsed illumination light L1 in synchronization with a light emission timing signal S1 provided from the camera controller 130. The pulsed illumination light L1 is preferably infrared light, but is not limited thereto, and may be visible light or ultraviolet light having a predetermined wavelength.

The image sensor 120 includes a plurality of pixels px, can control exposure in synchronization with an exposure timing signal S2 provided from the camera controller 130, and generates an image composed of a plurality of pixels. The image sensor 120 has sensitivity to the same wavelength as the pulsed illumination light L1 and captures reflected light (return light) L2 reflected by the object OBJ.

The camera controller 130 controls an irradiation timing (light emission timing) of the pulsed illumination light L1 by the illumination device 110 and an exposure timing by the image sensor 120. The functions of the camera controller 130 may be implemented by software processing, hardware processing, or a combination of software processing and hardware processing. The software processing is specifically implemented by a combination of a processor (hardware) such as a central processing unit (CPU), a micro processing unit (MPU) and a microcomputer and a software program executed by the processor (hardware). Note that the camera controller 130 may be a combination of multiple processors and software programs. The hardware processing is specifically implemented by hardware such as an application specific integrated circuit (ASIC), a controller IC, and a field programmable gate array (FPGA).

The images (slice images) $SIMG_i$ generated by the image sensor 120 are input to the arithmetic processing device 140. The arithmetic processing device 140 performs processing on the plurality of slice images $SIMG_1$ to $SIMG_N$ obtained for the plurality of ranges $RNG_1$ to $RNG_N$ and generates final output data CAMERAOUT. For example, the output data CAMERAOUT includes a set of the plurality of slice images $SIMG_1$ to $SIMG_N$. Furthermore, in the present embodiment, the output data CAMERAOUT includes a normal image NIMG.

The arithmetic processing device 140 may be mounted on the same hardware as the camera controller 130, or may be configured as separate hardware. Alternatively, some or all of the functions of the arithmetic processing device 140 may be implemented as a processor or digital circuit built in the same module as the image sensor 120.

The above is the basic configuration of the gating camera 100. Subsequently, operations thereof will be described.

Figure 2:
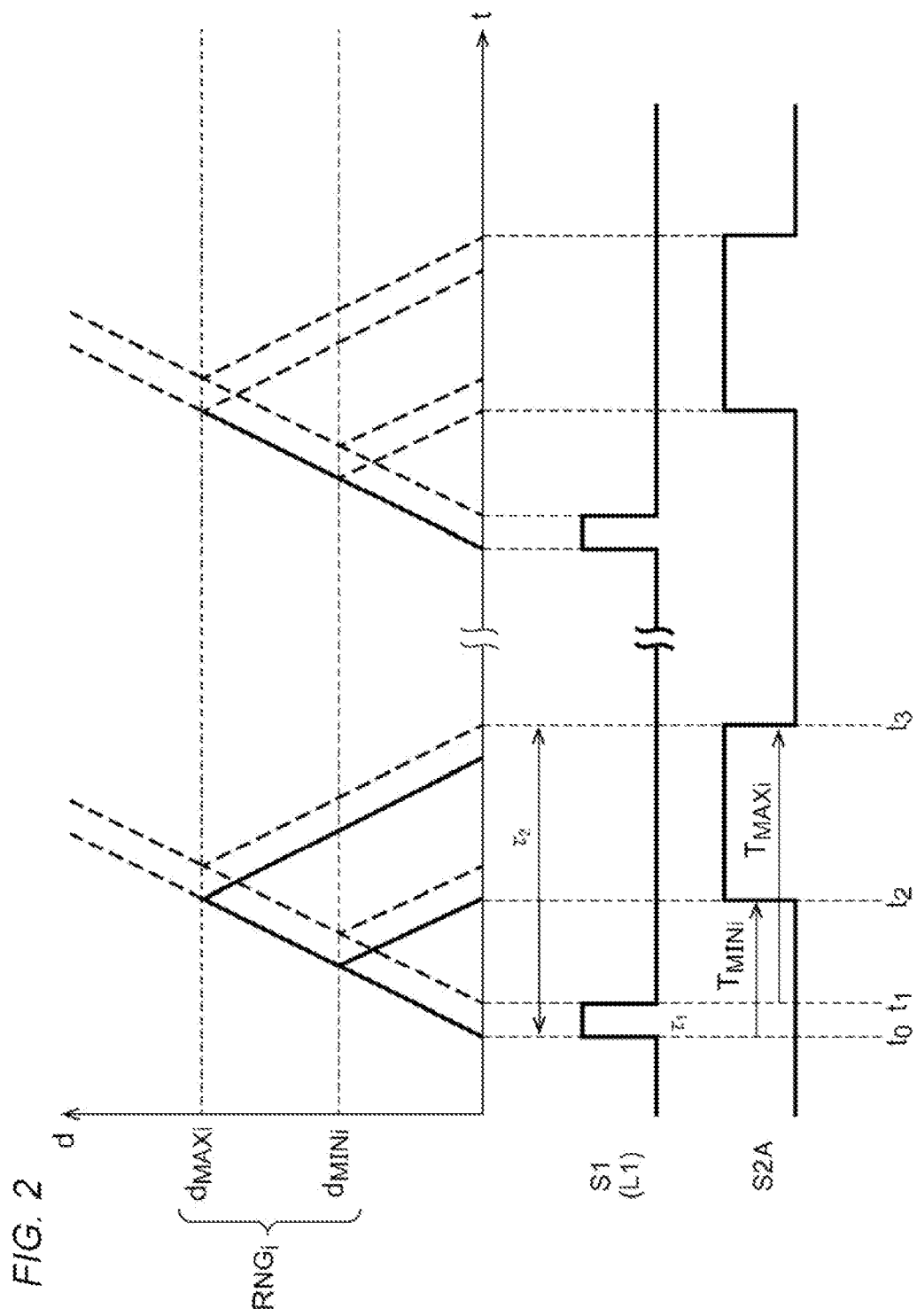
FIG. 2 is a view illustrating a basic operation of a gating camera.

FIG. 2 is a diagram illustrating a basic operation of the gating camera 100. FIG. 2 shows an aspect when sensing an i-th range $RNG_i$. The illumination device 110 emits light during a light emission period $\tau_1$ between time $t_0$ and time $t_1$ in synchronization with the light emission timing signal S1. At the top, a diagram of a light beam where a time is indicated on the horizontal axis and a distance is indicated on the vertical axis is shown. A distance from the gating camera 100 to a front side boundary of the range $RNG_i$ is set to $d_{MINi}$ and a distance from the gating camera 100 to a deep side boundary of the range $RNG_i$ is set to $d_{MAXi}$.

Round-trip time $T_{MINi}$ from when light emitted from the illumination device 110 at a certain time point reaches the distance $d_{MINi}$ to when reflected light returns to the image sensor 120 is expressed as $$T_{MINi} = 2 \times d_{MINi}/c,$$

in which c is the speed of light.

Similarly, round-trip time $T_{MAXi}$ from when light emitted from the illumination device 110 at a certain time point reaches the distance $d_{MAXi}$ to when reflected light returns to the image sensor 120 is expressed as $$T_{MAXi} = 2 \times d_{MAXi}/c.$$

When it is desired to image the object OBJ included in the range $RNG_i$, the camera controller 130 generates the exposure timing signal S2 so that the exposure starts at a time point $t_2=t_0+T_{MINi}$ and ends at a time point $t_3=t_1+T_{MAXi}$. This is one sensing operation.

The sensing of the i-th range $RNG_i$ may include a plurality of sets of light emission and exposure. The camera controller 130 repeats the aforementioned sensing operation multiple times at a predetermined period $\tau_2$.

Although described in detail below, the image sensor 120 can perform multiple exposure, subjects multiple reflected lights, which can be obtained as a result of performing pulsed light emission multiple times, to multiple exposure in an FD region (charge accumulation region) for each pixel px, and generates one slice image SIMG.

Figure 3:
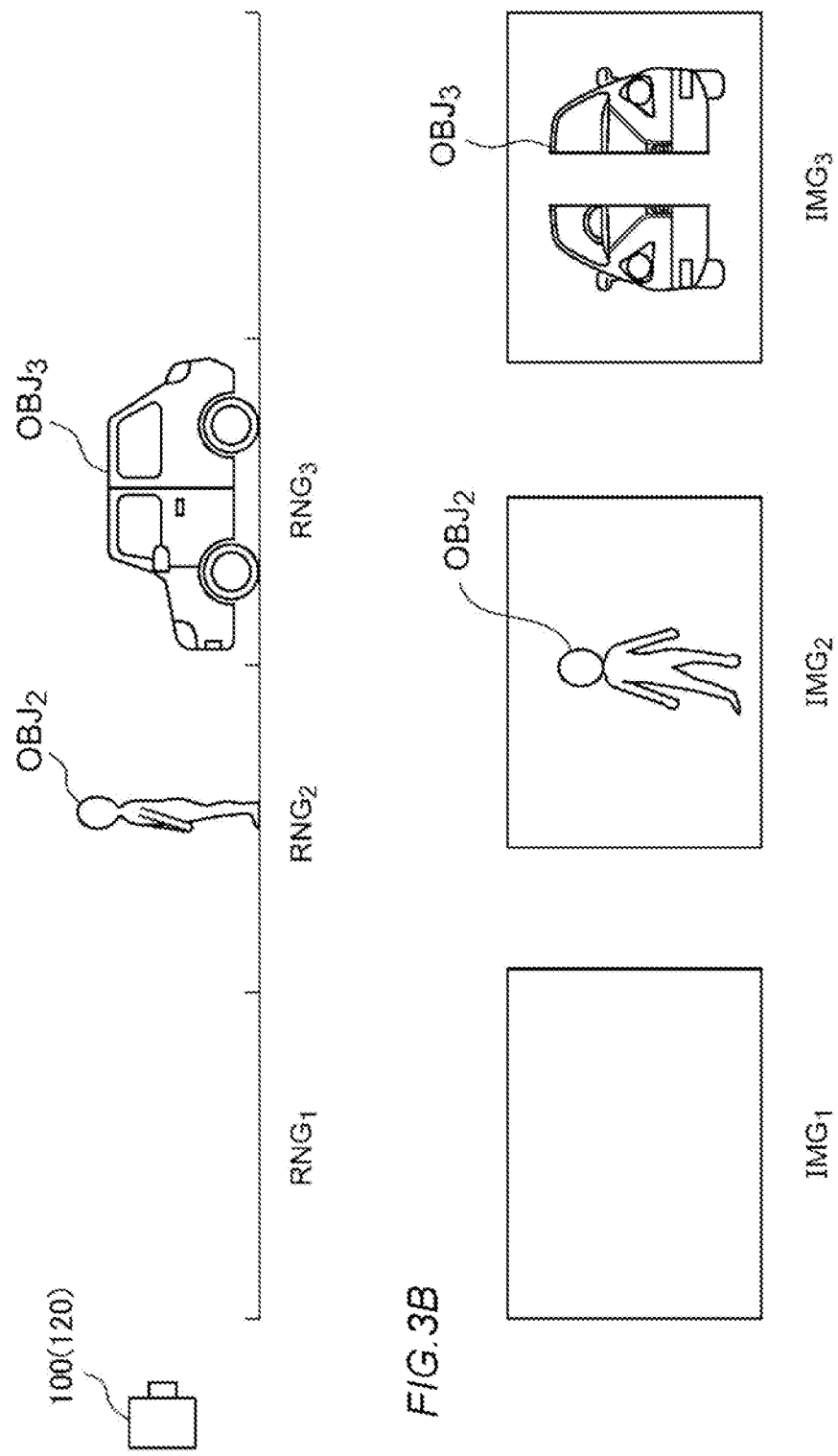
FIG. 3A and FIG. 3B are views illustrating slice images obtained by the gating camera.

FIG. 3A and FIG. 3B are views illustrating slice images obtained by the gating camera 100. In the example of FIG. 3A, an object (pedestrian) $OBJ_2$ is present in the range $RNG_2$ and an object (vehicle) $OBJ_3$ is present in the range $RNG_3$. FIG. 3B shows a plurality of slice images $SIMG_1$ to $SIMG_3$ obtained in a situation in FIG. 3A. When the slice image $SIMG_1$ is captured, no object image appears in the slice image $SIMG_1$ because the image sensor is exposed only to reflected light from the range $RNG_1$.

When the slice image $SIMG_2$ is captured, only the object image $OBJ_2$ appears in the slice image $SIMG_2$ because the image sensor is exposed only to reflected light from the range $RNG_2$. Similarly, when the slice image $SIMG_3$ is captured, only the object image $OBJ_3$ appears in the slice image $SIMG_3$ because the image sensor is exposed only to reflected light from the range $RNG_3$. In this way, an object can be separately captured on a range basis by the gating camera 100.

An image (normal image), which is similar to an image captured by a normal camera, may be generated by synthesizing the plurality of slice images $SIMG_1$ to $SIMG_N$ after the sensing of the full ranges $RNG_1$ to $RNG_N$ is completed. However, in this case, it takes a very long time to generate one normal image.

The gating camera 100 according to the present embodiment is configured to generate the normal image NIMG not divided into a plurality of ranges, in parallel with the generation of the slice images $SIMG_1$ to $SIMG_N$. In the below, the generation of a normal image will be described.

Returning to FIG. 1, the image sensor 120 is a multi-tap type, and one pixel has a plurality of FD regions fd. Each pixel px of the image sensor 120 includes a plurality of FD regions, at least one the FD regions is allocated as a pulse exposure region fdp for generation of a slice image SIMG, and at least another one of the FD regions is allocated as a continuous exposure region fdc for generation of a normal image NIMG.

Under control by the camera controller 130, the illumination device 110 repeatedly irradiates the field of view with the pulsed illumination light L1, and the image sensor 120 generates a slice image SIMG by performing multiple exposure of the reflected light L2 from the field of view using the pulse exposure region fdp. An exposure period by the pulse exposure region fdp is called a pulse exposure period Tp. When sensing an i-th range $RNG_i$, reflected light L2x from an object OBJx present in the i-th range $RNG_i$ is detected by the pulse exposure region fdp, but reflected light L2y from an object OBJy present in another range RNG is not incident on the image sensor 120 during the pulse exposure period Tp and, thus, is not detected by the pulse exposure region fdp.

In addition, under control by the camera controller 130, the image sensor 120 generates a normal image NIMG by performing exposure using the continuous exposure region fdc in a section where the pulse exposure region fdp is not used. An exposure period by the continuous exposure region fdc is called a continuous exposure period Tc. The reflected lights L3x and L3y from the objects OBJx and OBJy in the full range are detected by the continuous exposure region fdc. The reflected light L3 may include reflected light of the pulsed illumination light L1 and reflected light of sunlight. However, the reflected light of the pulsed illumination light L1 from the range $RNG_i$ of the detection target is not incident on the image sensor 120 during the continuous exposure period Tc and, thus, is not detected by the continuous exposure region fdc. In other words, as for the capturing of the normal image NIMG, the object OBJ in the range $RNG_i$ of the detection target is captured using the reflected light of sunlight, not the reflected light of the pulsed illumination light L1.

The above is the configuration of the gating camera 100. Subsequently, operations thereof will be described.

Figure 4:
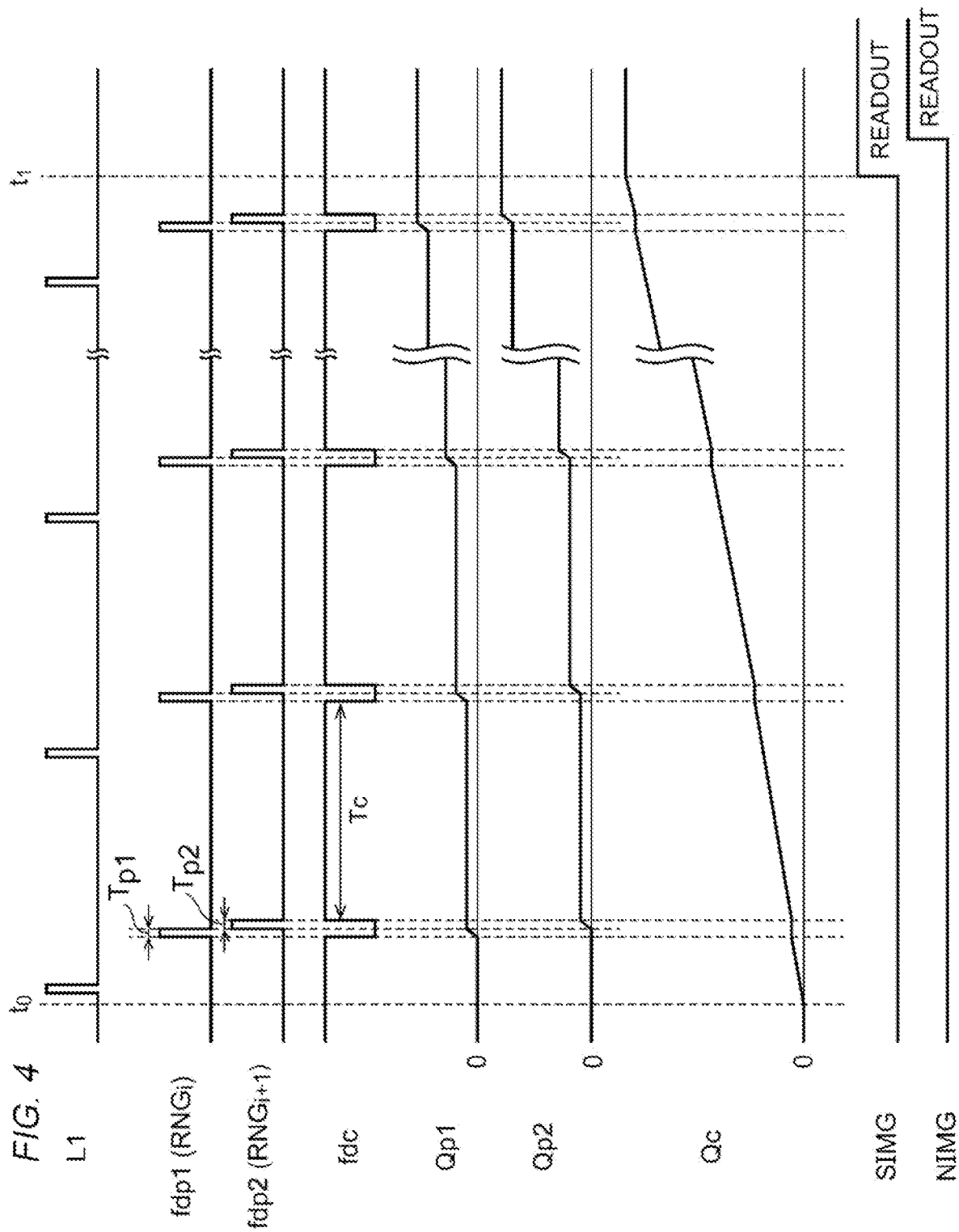
FIG. 4 is a time chart illustrating generation of a slice image SIMG and a normal image NIMG by the gating camera.

FIG. 4 is a time chart illustrating generation of a slice image SIMG and a normal image NIMG by the gating camera 100. In this example, the pixel includes three FD regions fd, two of which are pulse exposure regions fdp1 and fdp2 and are allocated to generation of slice images SIMG of two adjacent ranges $RNG_i$ and $RNG_{i+1}$. A set of the two ranges $RNG_i$ and $RNG_{i+1}$ is called a zone. $t_0$ represents an exposure start time of one zone, and $t_1$ represents an exposure time.

In this time chart, high of L1 represents light emission of pulsed illumination light, and high of fdp1, fdp2, and fdc represents exposure of each FD region. Exposure periods by the pulse exposure regions fdp1 and fpd2 are referred to as pulse exposure periods Tp1 and Tp2 and an exposure period by the continuous exposure region fdc is referred to as a continuous exposure period Tc. The pixel includes a light receiving element such as a photodiode, in addition to a plurality of FD regions. Each FD region is exclusively connected to the light receiving element during its exposure period. In addition, Qp1, Qp2, and Qc represent charge amounts of the FD regions fdp1, fdp2 and fdc, respectively.

The exposure timings of the pulse exposure regions fdp1 and fdp2 are determined according to positions of the ranges to be captured. The arithmetic processing device 140 may obtain fine distance information within a range by an indirect ToF method using pixel values of the two pulse exposure regions fdp1 and fdp2.

For the ranges $RNG_i$ and $RNG_{i+1}$, in order to obtain sufficiently bright slice images, that is, to accumulate sufficient charge amounts in the pulse exposure regions fdp1 and fdp2, it is necessary to repeat light emission of the pulsed illumination light L1 and exposure by the pulse exposure regions fdp1 and fpd2 on the order of hundreds to hundreds of thousands of times.

The remaining one of the three FD regions fd is a continuous exposure region fdc and is allocated to generation of the normal image NIMG. The continuous exposure region fdc is used during a period (continuous exposure period) for which both the pulse exposure regions fdp1 and fdp2 are unused.

In the continuous exposure period, the reflected light L2 of the pulsed illumination light L1 by the object in the full range of the field of view is incident on the pixel. In addition, reflected light of sunlight by an object in the full range of the field of view is incident on the pixel. Thereby, the charge amount accumulated in the continuous exposure region fdc during the continuous exposure period configures a normal image NIMG capturing the full range of the field of view.

In this example, it is assumed that the image sensor 120 can read a plurality of FD regions only at the same timing. That is, it is assumed that when reading is performed once, the charges in the plurality of FD regions are reset. In this case, when sensing of one zone is completed at time t1, the pulse exposure regions fdp1 and fdp2 and the continuous exposure region fdc are read, and two slice image SIMG and one normal image NIMG can be obtained.

The above is the operation of the gating camera 100.

According to the gating camera 100, the normal image NIMG can be generated in parallel with the generation of the slice image SIMG by subjecting stationary light, which does not depend on the pulsed illumination light L1, to the continuous exposure using the FD region not used for the generation of the slice image. Since the normal image NIMG can be obtained without waiting for the capturing completion of all the ranges $RNG_1$ to $RNG_N$, a generation time of the normal image NIMG can be shortened.

Note that when the gating camera 100 is used during the day, sunlight becomes noise with respect to the generation of a slice image. Therefore, a wavelength of the pulsed illumination light L1 and a sensitivity wavelength of the image sensor 120 need to be selected from a region where the spectral intensity of sunlight is weak. In other words, the image sensor 120 has low sensitivity to stationary light that is dominant when capturing the normal image NIMG. Here, in FIG. 4, the pulse exposure periods Tp1 and Tp2 are approximately on the order of $1/100$ to $1/1000$ of a light emission interval of the pulsed illumination light L1. Therefore, the continuous exposure period Tc is on the order of tens to hundreds of times larger than the pulse exposure periods Tp1 and Tp2. Therefore, even when the sensitivity of the image sensor 120 to sunlight is low, a sufficiently bright normal image can be generated.

Below, variations of the configuration or sensing of the gating camera 100 will be described.

Figure 5:
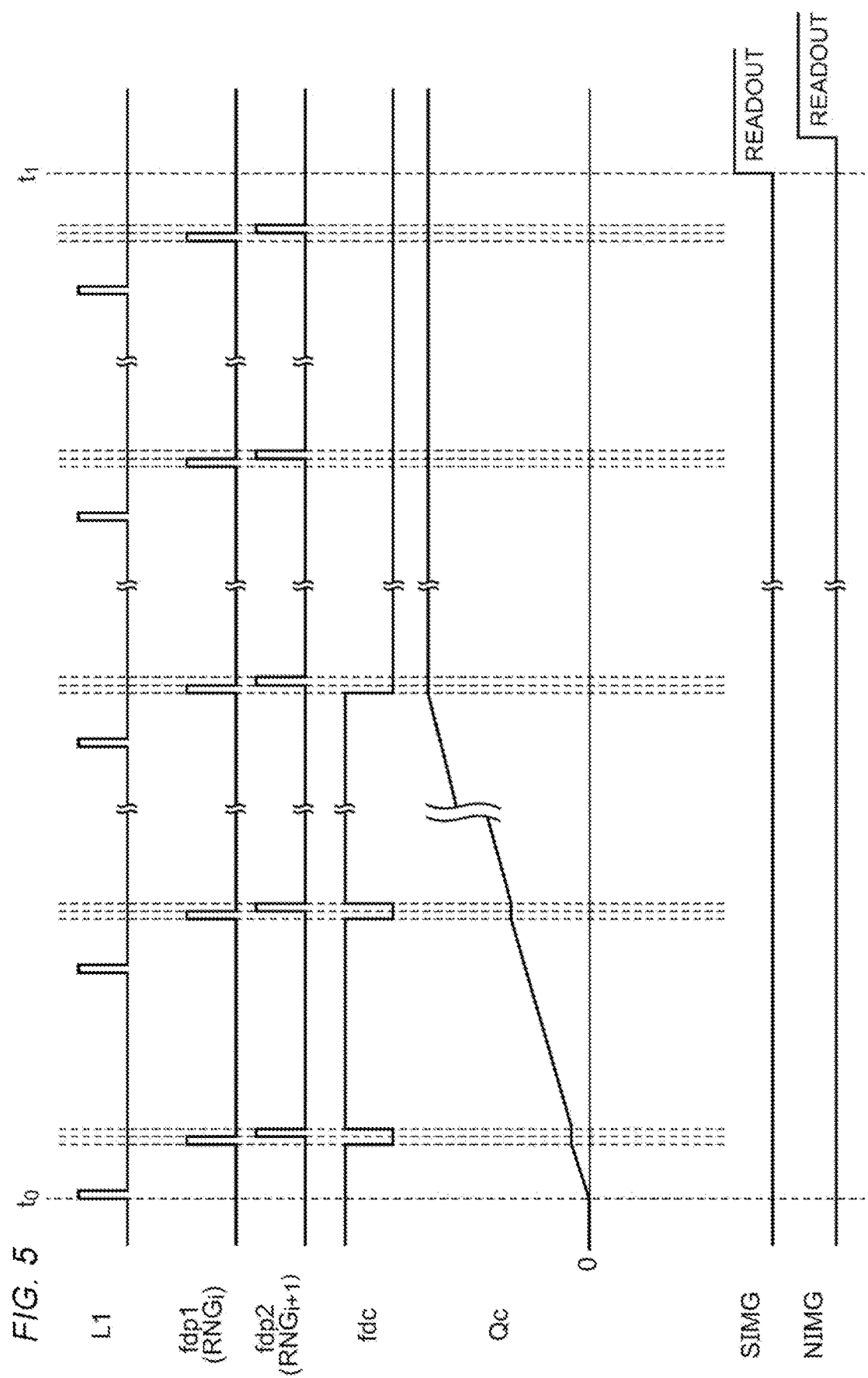
FIG. 5 is a time chart of sensing according to Variation 1.

FIG. 5 is a time chart of sensing according to Variation 1. When a charge amount enabling obtainment of a normal image with required brightness is accumulated in the continuous exposure region fdc, the exposure of the continuous exposure region fdc may be stopped at that time point without waiting for completion of sensing of one zone. This prevents overexposure of the normal image due to pixel saturation.

Figure 6:
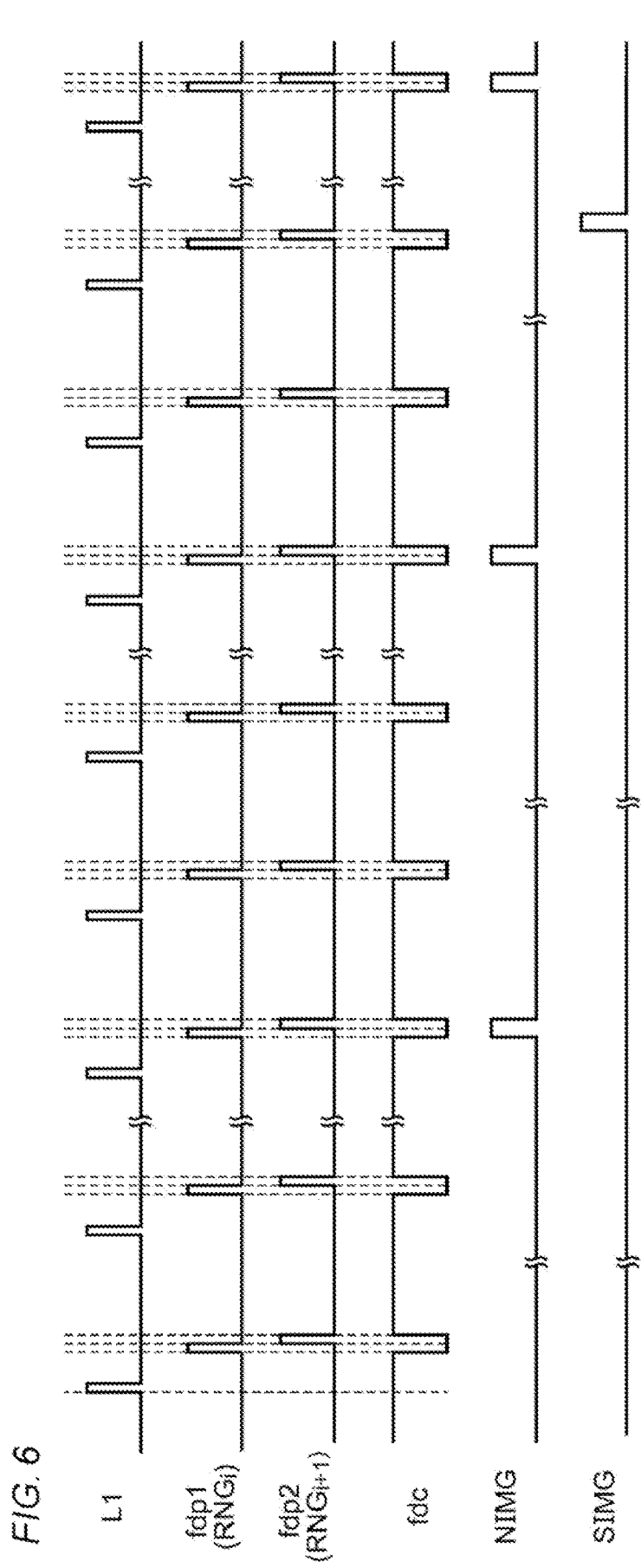
FIG. 6 is a time chart of sensing according to Variation 2.

FIG. 6 is a time chart of sensing according to Variation 2. In FIG. 4, it is assumed that the plurality of FD regions of the image sensor 120 can be read only at the same timing. However, the present invention is not limited thereto. In Variation 2, the image sensor 120 is configured to read at an independent timing for each FD region. In Variation 2, whenever exposure of the continuous exposure region fdc is completed, the pulse exposure region fdp is read to generate a normal image NIMG and new continuous exposure for generation of a next normal image NIMG is started, without waiting for exposure completion of the pulse exposure region fdp.

According to Variation 2, compared to the case of FIG. 4 or FIG. 5, a frame rate of the normal image NIMG can be increased.

Second Embodiment

As described in the first embodiment, the reflected light of the pulsed illumination light L1 from the range $RNG_i$ of the detection target is not incident on the image sensor 120 during the continuous exposure period Tc and, thus, is not detected by the continuous exposure region fdc. As for the capturing of the normal image NIMG, the object OBJ in the range $RNG_i$ of the detection target is captured using the reflected light of sunlight, not the reflected light of the pulsed illumination light L1.

In the configuration of FIG. 1, in order to obtain the normal image NIMG at night during which there is no sunlight, sensing over two zones is required, which increases a sensing time of the normal image NIMG. In a second embodiment, a technology for solving this problem will be described.

Figure 7:
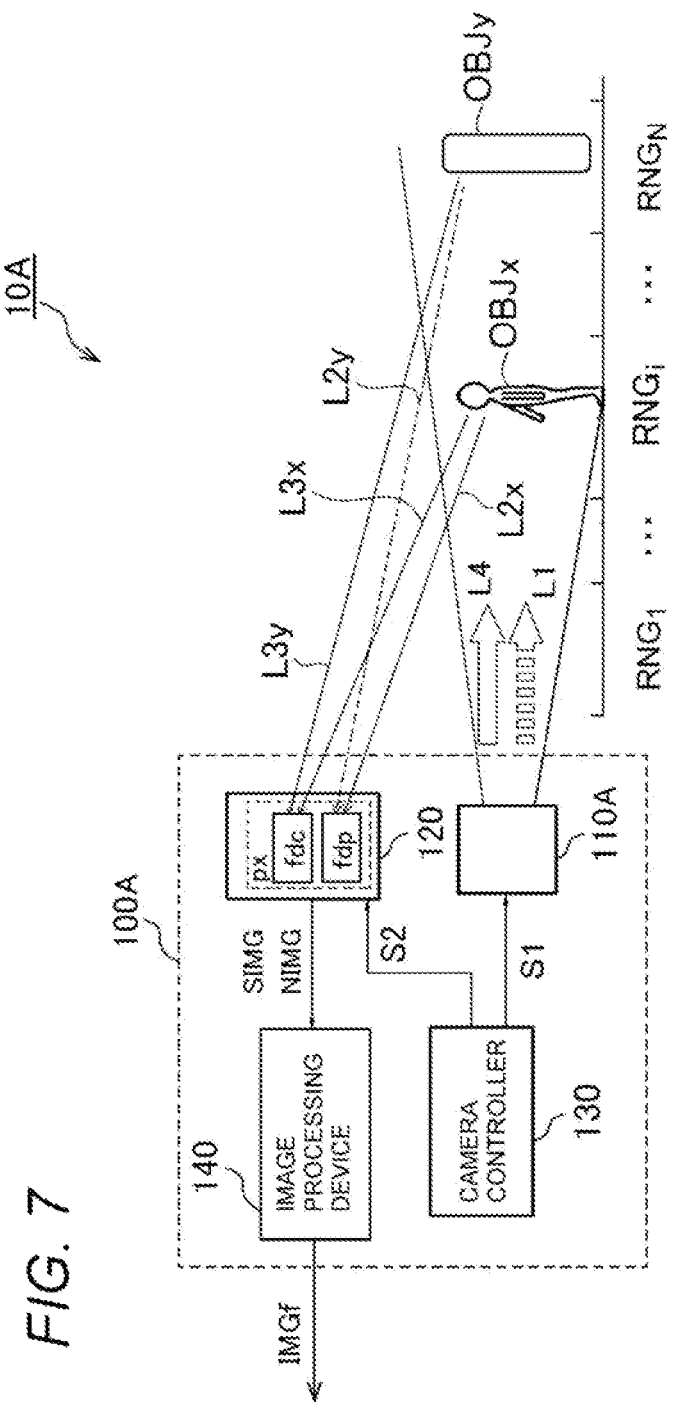
FIG. 7 is a block diagram of a sensing system including a gating camera according to a second embodiment.

FIG. 7 is a block diagram of a sensing system 10A including a gating camera 100A according to a second embodiment. As for the gating camera 100A, differences from the gating camera 100 according to the first embodiment will be explained.

An illumination device 110A irradiates the field of view with continuous illumination light L4, in addition to the pulsed illumination light L1. The others are similar to the first embodiment. Subsequently, an operation of the gating camera 100A will be described.

Figure 8:
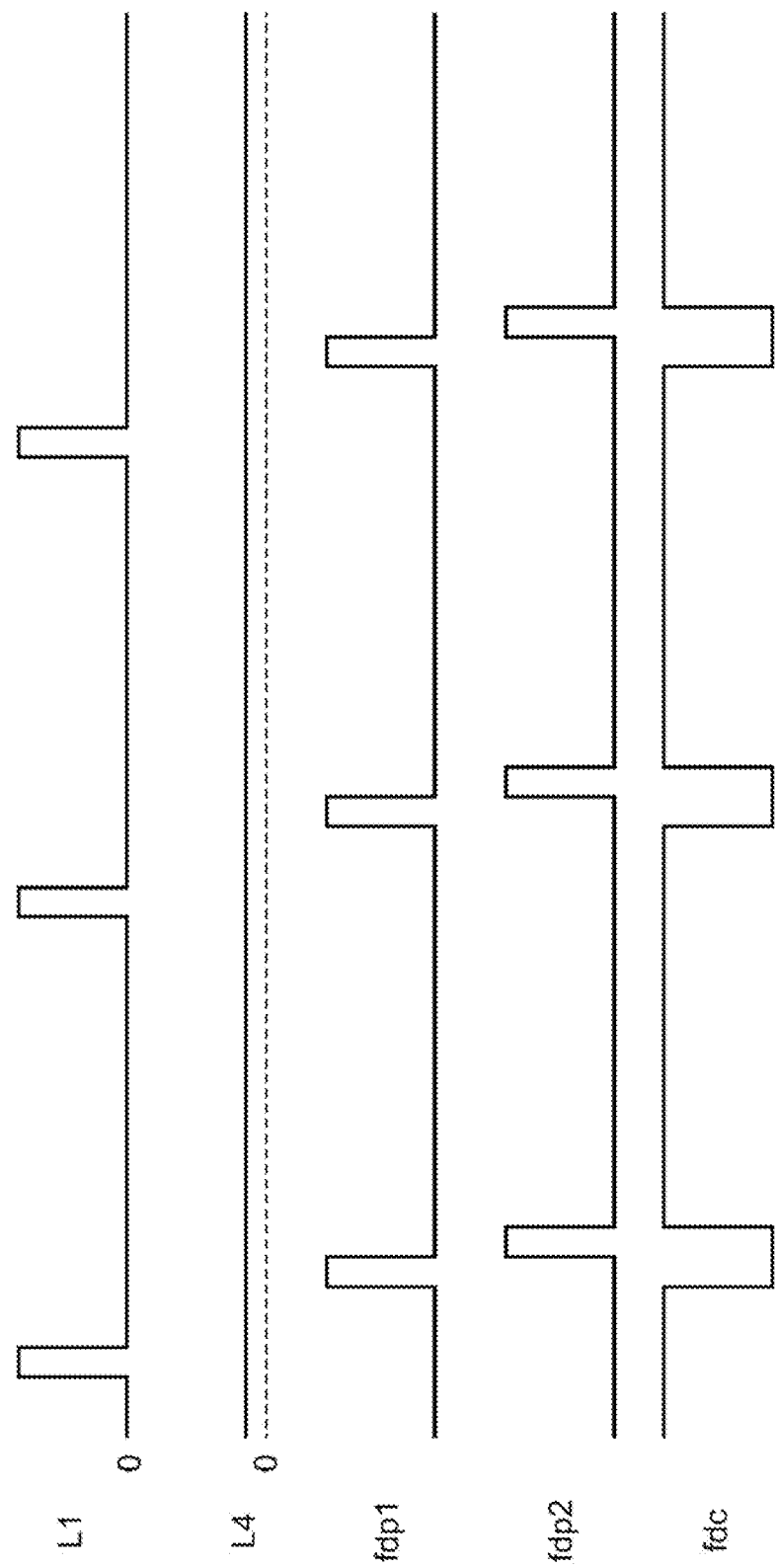
FIG. 8 is a time chart illustrating an operation of the gating camera of FIG. 7.

FIG. 8 is a time chart illustrating an operation of the gating camera 100A of FIG. 7.

Under control by the camera controller 130, the illumination device 110A repeatedly irradiates the field of view with the pulsed illumination light L1, and the image sensor 120 generates a slice image SIMG by performing multiple exposure of the reflected light L2 from the field of view using the pulse exposure region fdp. The generation of the slice image SIMG is similar to the first embodiment.

In addition, under control by the camera controller 130, the illumination device 110A irradiates the field of view with the continuous illumination light L4. The intensity of the continuous illumination light L4 is low compared to the peak intensity of the pulsed illumination light L1.

Under control by the camera controller 130, the image sensor 120 generates a normal image NIMG by performing exposure using the continuous exposure region fdc during the continuous exposure period Tc for which the pulse exposure region fdp is not used. The reflected lights L3$x$ and L3$y$ from the objects OBJx and OBJy in the full range are detected by the continuous exposure region fdc. The reflected light L3 may include reflected light of the pulsed illumination light L1 and reflected light of the continuous illumination light L4. However, the reflected light of the pulsed illumination light L1 from the range $RNG_i$ of the detection target is not incident on the image sensor 120 during the continuous exposure period Tc and, thus, is not detected by the continuous exposure region fdc. In other words, as for the capturing of the normal image NIMG, the object OBJ in the range $RNG_i$ of the detection target is captured using the reflected light of the continuous illumination light L4, not the reflected light of the pulsed illumination light L1.

According to the gating camera 100A of the second embodiment 2, it is possible to generate the normal image NIMG in a short period even at night during which there is no sunlight.

Note that during the day when there is sunlight, a normal image can be captured using reflected light of sunlight. Therefore, during the day, the irradiation of the continuous illumination light L4 can be turned off, whereby an increase in power consumption can be suppressed.

Third Embodiment

In the description so far, each pixel px has one continuous exposure region fdc. However, the present invention is not limited thereto. For example, each pixel may have two or more continuous exposure regions fdc.

Figure 9:
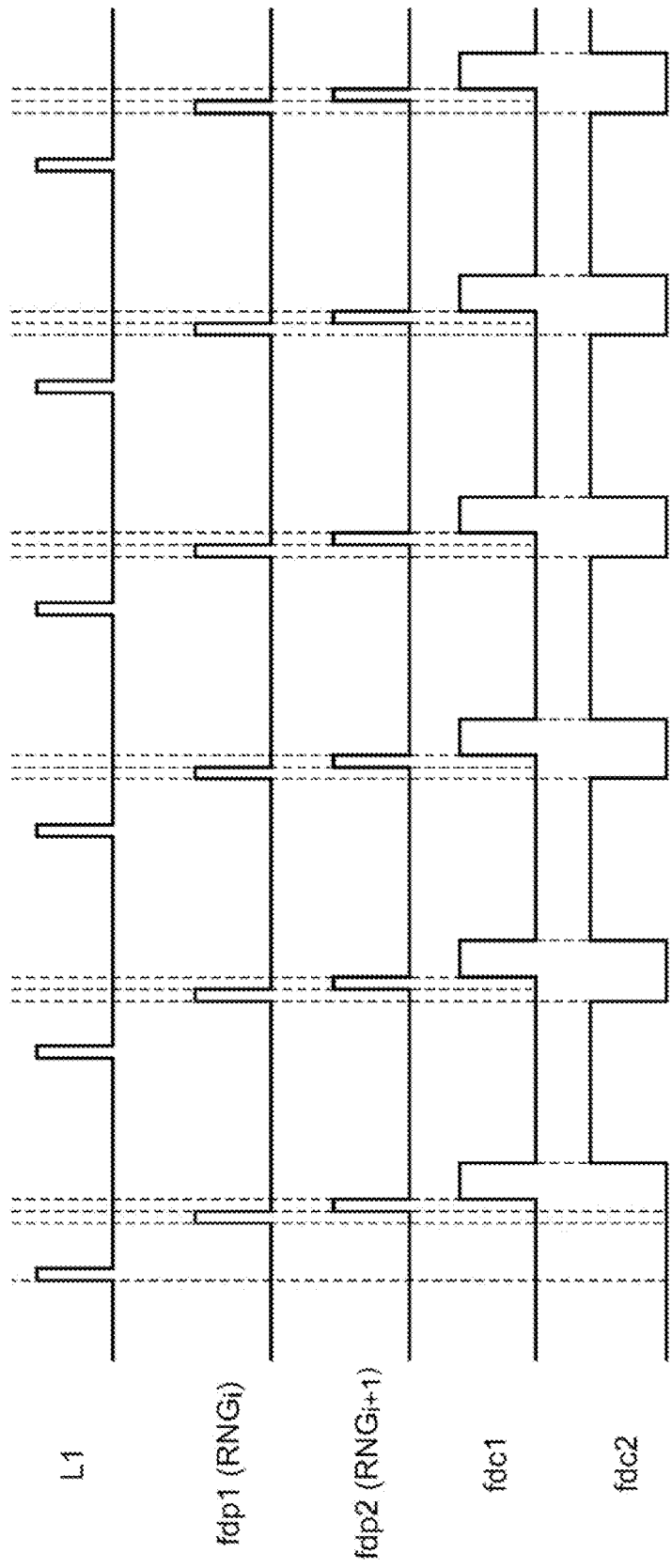
FIG. 9 is a diagram illustrating an operation of a gating camera of a third embodiment.

FIG. 9 is a diagram illustrating an operation of a gating camera of a third embodiment. Under control by the camera controller 130, the image sensor 120 generates a normal image NIMG by performing exposure using the two continuous exposure regions fdc1 and fdc2 in a time-division manner during the continuous exposure period Tc for which the pulse exposure region fdp is not used. The exposure times of the two continuous exposure regions fdc1 and fdc2 are different, and two normal NIMG images are captured with different exposures.

According to the third embodiment, when the difference in brightness and darkness in the field of view is large, a bright object (an object with high reflectance) and a dark object (an object with low reflectance) are easily detected by using images captured by the plurality of continuous exposure regions fdc1 and fdc2. Alternatively, by synthesizing images captured by the two continuous exposure regions fdc1 and fdc2, it is possible to capture a high dynamic range (HDR) image with a wide dynamic range in which overexposure and underexposure are suppressed.

Fourth Embodiment

Figure 10:
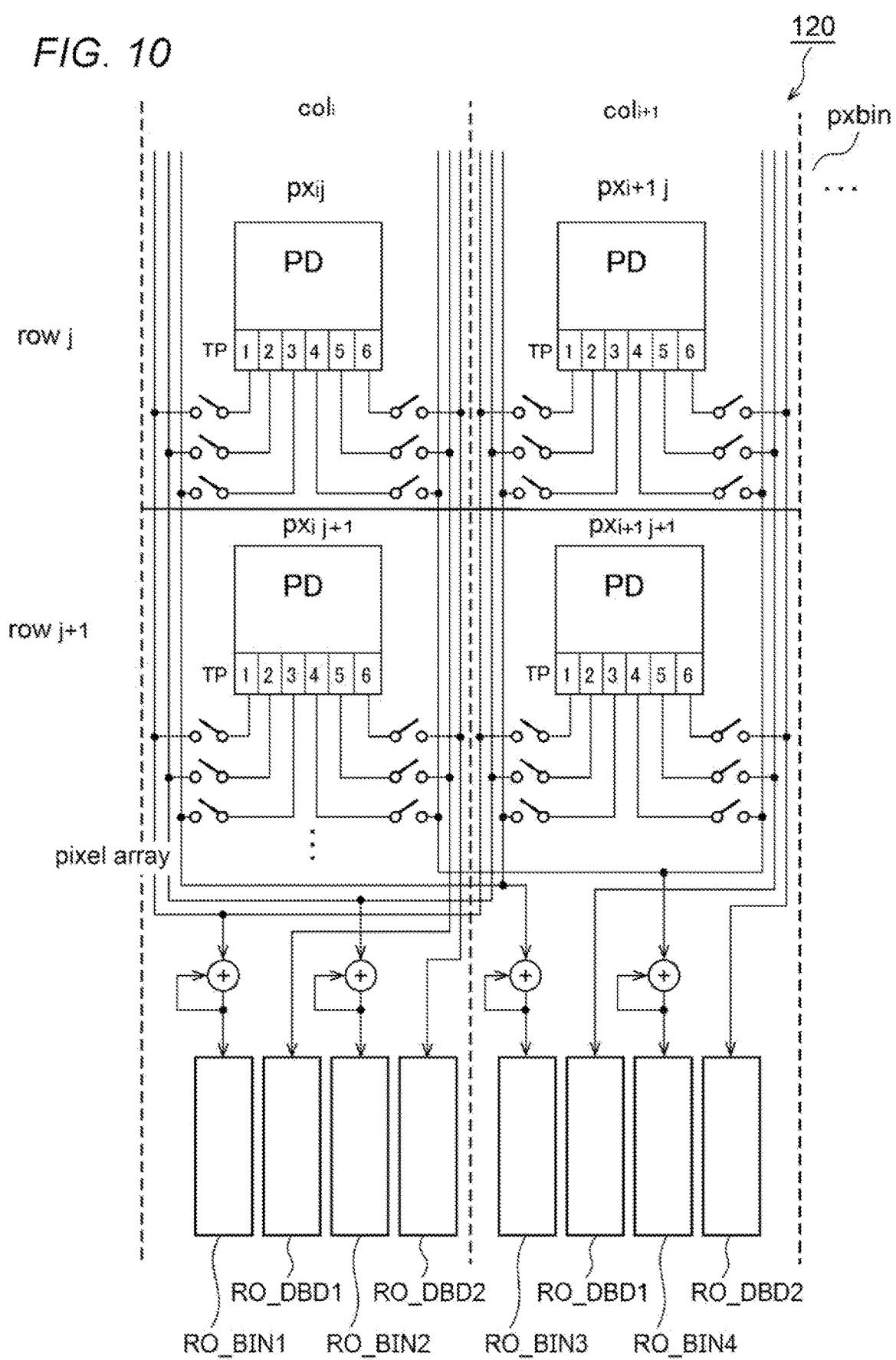
FIG. 10 is a circuit diagram of an image sensor used in a gating camera according to a fourth embodiment.

FIG. 10 is a circuit diagram of an image sensor 120C used in a gating camera according to a fourth embodiment. In this example, each pixel px includes m (m≥1) pulse exposure regions fdp and n (n≥1) continuous exposure regions fdc, and includes a total of m+n FD regions. In this example m=4 and n=2. Each FD region is provided with a tab and is adapted so that a signal can be read.

That is, among the six FD regions, four FD regions are pulse exposure regions fdp1 to fdp4 and are provided with four tabs TP1 to TP4. The remaining two FD regions are continuous exposure regions fdc1 and fdc2 and are provided with two tabs TP5 and TP6.

Since each pixel includes four pulse exposure regions fdp1 to fdp4, four slice images corresponding to four ranges are generated simultaneously. In addition, as described in the third embodiment, two normal images NIMG are captured at different exposures using the two continuous exposure regions fdc1 and fdc2.

In the present embodiment, the four slice images are generated by pixel binning. Specifically, a plurality of adjacent pixels (4 pixels in this example) are combined to generate a virtual pixel pxbin. That is, the resolution of the slice image is lower than that of the normal image.

In FIG. 10, the i-th column and the (i+1)-th column and the j-th row and (j+1)-th row are shown, and 4 pixels $px_{i,j}$, $px_{i+1,j}$, $px_{i,j+1}$ and $px_{i+1,j+1}$ over 2 rows and 2 columns are integrated by pixel binning.

The image sensor includes m (m=4) first reading circuits RO_BIN1 to RO_BIN4 every two columns and n (n=2) second reading circuits RO_DBD1 and RO_DBD2 every column. The four first reading circuits RO_BIN1 to RO_BIN4 are associated with the four pulse exposure regions fdp1 to fpd4 of each pixel of the corresponding two columns. Furthermore, the two second reading circuits RO_DBD1 and RO_DBD2 are associated with the two continuous exposure regions fdc1 and fdc2 in the corresponding column. The adjacent reading circuits RO_DBD and ROBIN can be used in combination and can be used while switching therebetween.

The i-th (1≤i≤m) first reading circuit RO_BINi can add a signal of the i-th pulse exposure region fdpi of each of the four pixels included in the virtual pixel pxbin and read the added signal.

The j-th (1≤j≤n) second reading circuit RO_DBDj can read a signal of the j-th continuous exposure region fdcj included in the pixel in the corresponding column.

In addition, according to the image sensor 120, a high-resolution normal image NIMG can be generated by dotby-dot reading. On the other hand, according to the image sensor 120, the slice image SIMG is generated by the pixel binning processing, so that the generation time can be shortened in exchange for deterioration in resolution.

Use

Figure 11:
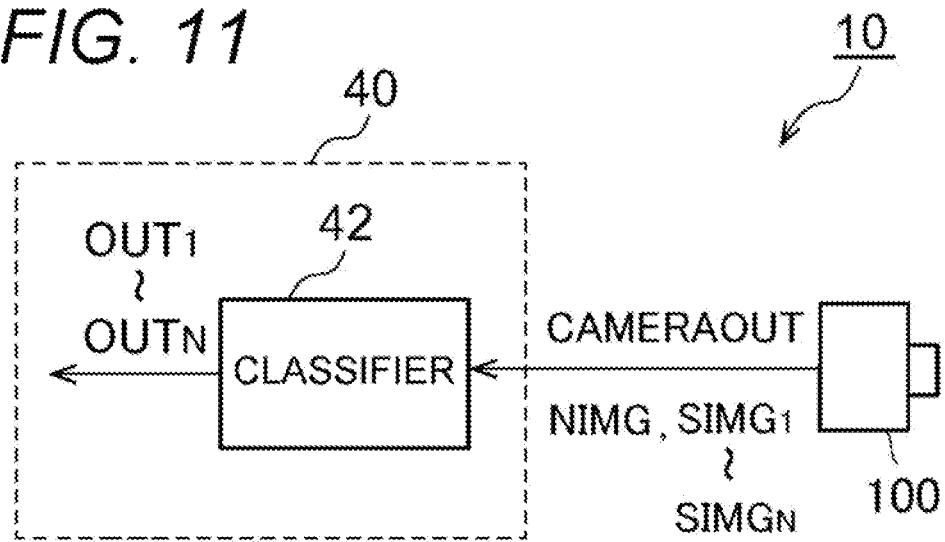
FIG. 11 is a block diagram of a sensing system.

FIG. 11 is a block diagram of the sensing system 10. The sensing system 10 includes an arithmetic processing device 40, in addition to the gating camera 100 described above. The sensing system 10 is an object detection system that is mounted on a vehicle such as an automobile and a motorcycle and determines a type (also called category or class) of an object OBJ around the vehicle.

The gating camera 100 generates a plurality of slice images $IMG_1$ to $IMG_N$ corresponding to a plurality of ranges $RNG_1$ to $RNG_N$. The output data CAMERAOUT of the gating camera 100 includes the plurality of slice images $SIMG_1$ to $SIMG_N$ and the usual image NIMG.

The arithmetic processing device 40 is configured to identify a type of an object on the basis of the output data CAMERAOUT of the gating camera 100. The arithmetic processing device 40 includes a classifier 42 installed on the basis of a learned model generated by machine learning. The arithmetic processing device 40 may include a plurality of classifiers 42 optimized for each range. An algorithm of the classifier 42 is not particularly limited, but YOLO (You Only Look Once), SSD (Single Shot MultiBox Detector), R-CNN (Region-based Convolutional Neural Network), SPPnet (Spatial Pyramid Pooling), Faster R-CNN, DSSD (Deconvolution-SSD), Mask R-CNN and the like may be adopted, or algorithms to be developed in the future may be adopted.

The functions of the arithmetic processing device 40 may be implemented by software processing, hardware processing, or a combination of software processing and hardware processing. The software processing is specifically implemented by a combination of a processor (hardware) such as a central processing unit (CPU), a micro processing unit (MPU) and a microcomputer and a software program executed by the processor (hardware). Note that the arithmetic processing device 40 may be a combination of multiple processors and software programs. The hardware processing is specifically implemented by hardware such as an application specific integrated circuit (ASIC), a controller IC, and a field programmable gate array (FPGA). The functions of the arithmetic processing device 40 and the functions of the image processing device 140 may be implemented in the same processor.

Figure 12A:
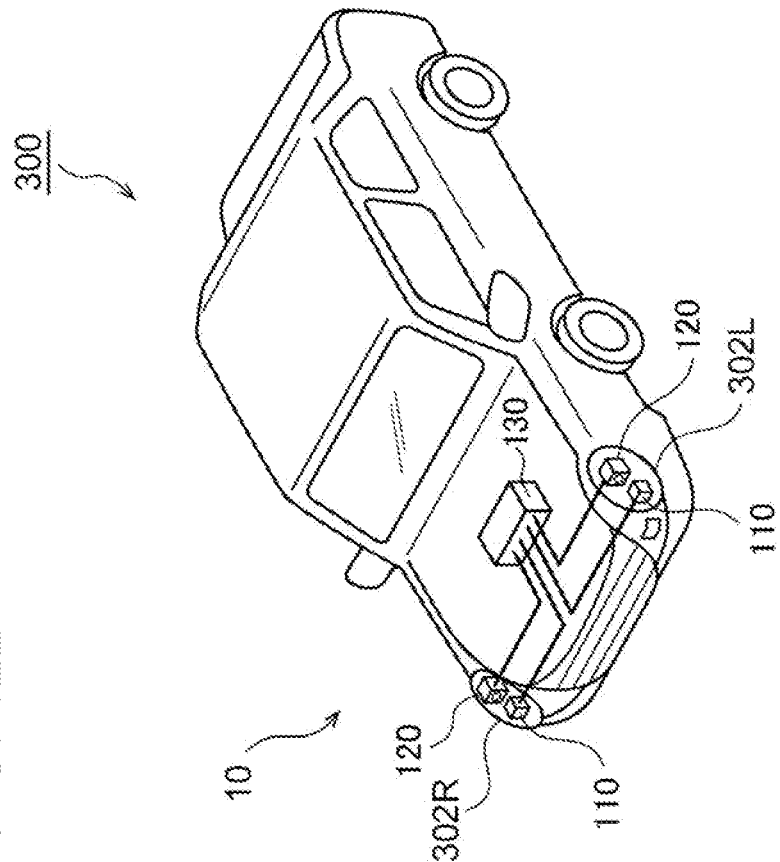
FIGS. 12A and 12B are views each showing an automobile having a gating camera.
Figure 12B:
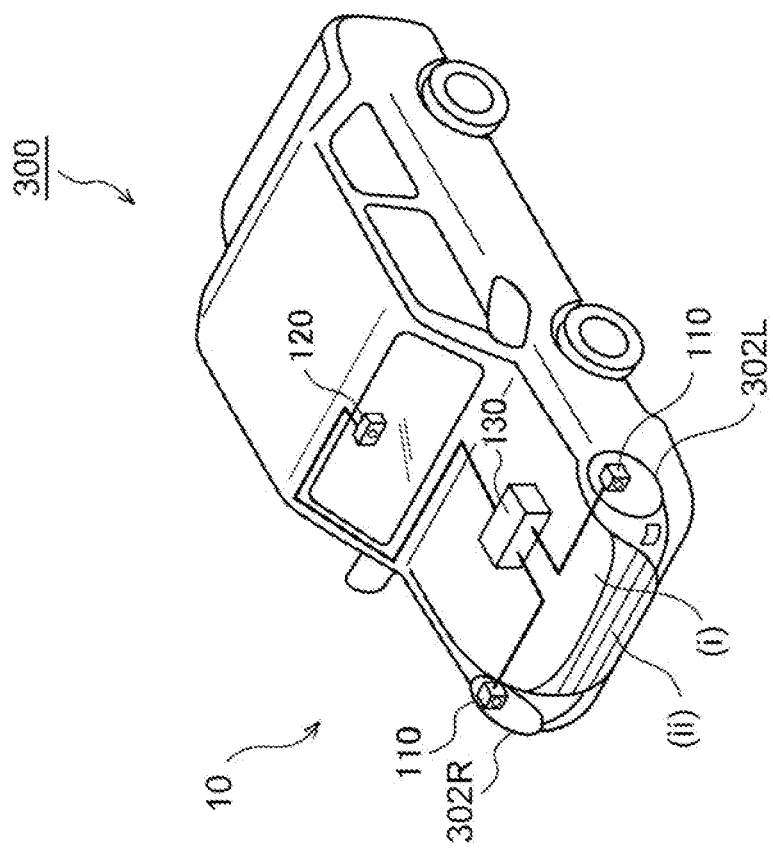

FIG. 12A and FIG. 12B are views each illustrating an automobile 300 having the gating camera 100. Referring to FIG. 12A, the automobile 300 includes headlamps (lamps) 302L and 302R.

As shown in FIG. 12A, the illumination device 110 of the gating camera 100 may be built in at least one of the left and right headlamps 302L and 302R. The image sensor 120 can be attached to a part of the vehicle, for example, a rear side of the room mirror. Alternatively, the image sensor 120 may be provided on the front grill or front bumper. The camera controller 130 may be provided in a vehicle compartment or an engine room, or may be built in the headlamp 302L or 302R.

As shown in FIG. 12B, the image sensor 120 may be built in any one of the left and right headlamps 302L and 302R together with the illumination device 110.

The illumination device 110 may be provided at a part of the vehicle, for example, on a rear side of the room mirror, the front grill, or the front bumper.

Figure 13:
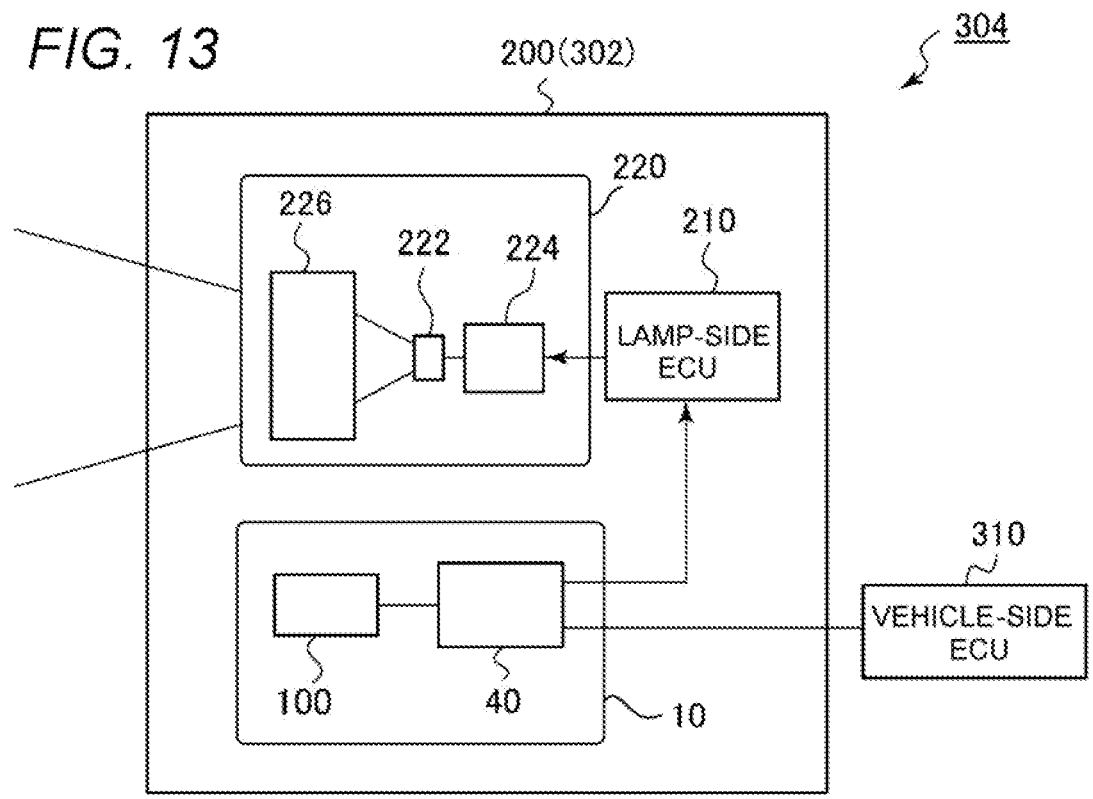
FIG. 13 is a block diagram showing a vehicle lamp including a sensing system.

FIG. 13 is a block diagram showing a vehicle lamp 200 including the sensing system 10. The vehicle lamp 200 configures a lamp system 304 together with a vehicle-side ECU 310. The vehicle lamp 200 includes a lamp-side ECU 210 and a lamp unit 220. The lamp unit 220 is a low beam or a high beam, and includes a light source 222, a lighting circuit 224, and an optical system 226. Further, the vehicle lamp 200 includes the sensing system 10.

Information about the object OBJ detected by the sensing system 10 may be used for light distribution control of the vehicle lamp 200. Specifically, the lamp-side ECU 210 generates a proper light distribution pattern on the basis of information about a type and a position of the object OBJ generated by the sensing system 10. The lighting circuit 224 and the optical system 226 operate so that the light distribution pattern generated by the lamp-side ECU 210 is obtained. The arithmetic processing device 40 of the sensing system 10 may be provided outside the vehicle lamp 200, that is, on a vehicle side.

Furthermore, the information about the object OBJ detected by the sensing system 10 may be transmitted to the vehicle-side ECU 310. The vehicle-side ECU 310 may use this information for automatic driving or driving support.

The embodiments are merely illustrative, and it should be understood by one skilled in the art that various variations can be made to combinations of components and processing processes in the embodiments and such variations also fall within the scope of the present invention.

The invention claimed is:

1. A gating camera configured to divide a field of view in a depth direction into a plurality of ranges and to generate a plurality of slice images corresponding to the plurality of ranges, the gating camera comprising:
    an illumination device configured to irradiate the field of view with pulsed illumination light;
    a multi-tap type image sensor in which one pixel has a plurality of FD (floating diffusion) regions; and
    a camera controller configured to controller a light emission timing of the illumination device and an exposure timing of the image sensor,
    wherein one of the plurality of FD regions is allocated as a pulse exposure region for generating a slice image and another one of the plurality FD regions is allocated as a continuous exposure region for generating a normal image, and
    wherein the image sensor is configured to generate the slice image by performing multiple exposure of reflected light of the pulsed illumination light from the field of view using the pulse exposure region, and to generate the normal image by performing exposure using the continuous exposure region in a section where the pulse exposure region is not used.

2. The gating camera according to claim 1, wherein the image sensor is configured to read at an independent timing for each FD region.

3. The gating camera according to claim 1, wherein the illumination device is configured to irradiate the field of view with continuous illumination light, in addition to the pulsed illumination light.

4. The gating camera according to claim 3, wherein the illumination device is configured to irradiate the field of view with the continuous illumination light during capturing at night.

5. The gating camera according to claim 1, wherein the continuous exposure region has a plural of continuous exposure regions, wherein the image sensor is configured to generate the normal image by performing exposure using the plurality of continuous exposure regions in a time division manner in the section where the pulse exposure region is not used, and wherein each exposure time of the plurality of continuous exposure regions are different.

6. The gating camera according to claim 1, wherein the image sensor is configured to generate the slice image by pixel binning, and to generate the normal image by dot-by-dot.

7. The gating camera according to claim 6, wherein the image sensor is configured to perform binning of pixels of 2 rows and 2 columns as a virtual pixel, wherein each pixel includes m (m≥1) pulse exposure regions and n (n≥1) continuous exposure regions, wherein the image sensor includes m first reading circuits, and n second reading circuits, wherein the m first reading circuits are associated with the m pulse exposure regions, wherein the n second reading circuits are associated with the n continuous exposure regions, wherein an i-th (1≤i≤m) first reading circuit is configured to add a signal of an i-th pulse exposure region of each of the four pixels included in the virtual pixel and read an added signal, and wherein a j-th (1≤j≤n) second reading circuit is configured to read a signal of a j-th continuous exposure region included in a corresponding pixel.

8. The gating camera according to claim 7, wherein m=4 and n=2.

9. The gating camera according to claim 1, wherein the gating camera is mounted on a vehicle.

10. A sensing system for a vehicle, comprising:
the gating camera according to claim 1; and
an arithmetic processing device configured to perform processing on the plurality of slice images captured by the gating camera.

11. A vehicle lamp comprising the gating camera according to claim 1.

* * * * *